May 12, 1959    D. J. SCHAUFFLER    2,886,780
DIFFERENTIAL MEASURING SYSTEMS
Filed April 13, 1954
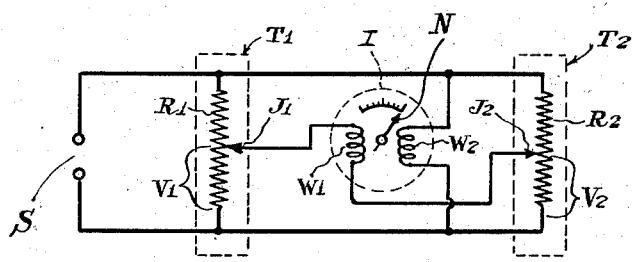
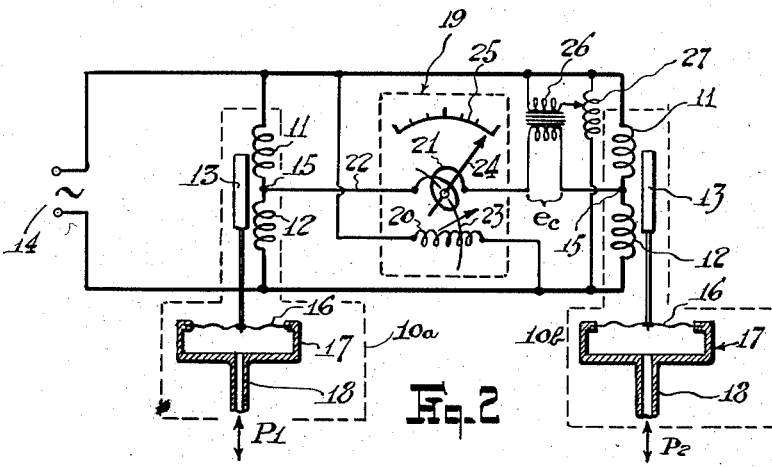
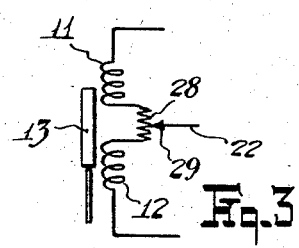
INVENTOR
David J. Schauffler
BY George H. Fritzinger
Agent

United States Patent Office 2,886,780
Patented May 12, 1959

2,886,780

DIFFERENTIAL MEASURING SYSTEMS

David J. Schauffler, Orange, N.J., assignor, by mesne assignments, to McGraw-Edison Company, Elgin, Ill., a corporation of Delaware Application April 13, 1954, Serial No. 422,736

7 Claims. (Cl. 324—140)

This invention relates to measuring systems for indicating the difference between variable quantities and conditions.

In its broadest aspects, the invention comprehends such systems operable by either direct current or alternating current and including a receiving instrument having a movable element responsive according to relative potentials impressed on two windings constituting part of the instrument, but for greater adaptability in indicating quantitative differences at a remote point a measuring system operable by alternating current is preferred. For such A.C. systems either an A.C. ratiometer or a null-type dynamometer indicator may be employed. However, certain features of my invention reside particularly in connection with a null-type dynamometer indicator and, accordingly, I herein particularly describe my invention in connection with such indicator but without intending any unnecessary limitation of my invention thereto.

It is an object of my invention to provide improved electrical systems for measuring differences between electrical quantities and conditions representable in terms of electrical quantities, such conditions being temperature, pressure, etc.

Another object is to provide a simple and efficient circuit for measuring quantitative differences with the use of standard transmitting and receiving instruments.

By way of preferred example, I herein particularly describe my invention in terms of inductive-type transmitters for producing divisions of electrical potential according to respective pressures, such transmitters being preferably of the type described and claimed in the co-pending application of Frederick G. Kelly, Serial No. 290,869, filed May 31, 1952, and now Patent No. 2,740,941, dated April 3, 1956. Further, I herein particularly describe my invention in terms of a receiving instrument or indicator of the dynamometer type described and claimed in Kelly Patent No. 2,572,626, dated October 23, 1951. Both the application and patent just mentioned have common ownership with the present application.

A further object of my invention is to provide novel means in connection with such dynamometer indicators for setting the indicator to zero or to any desired point on the scale whereby to enable the measurement of plus or minus differentials, or both, on the same scale.

A further object is to provide a readily adjustable electrical means for so setting the zero point on the scale of the indicator and for compensating for tolerance variations in components of the measuring system.

These and other objects and features of my invention will be apparent from the following description and the appended claims, reference being had to the accompanying drawings, of which:

Figure 1 is a generalized circuit diagram illustrating my invention;

Figure 2 is a more specific circuit diagram of my invention as adapted for measuring the difference between two pressures; and Figure 3 is a fractional view illustrating a modification of the embodiment of Figure 2.

In the generalized circuit diagram shown in Figure 1 there is a potential source S of either alternating current or direct current, two transmitters $T_1$ and $T_2$ which, for example, may be identical and which are shown for purposes of generalization and simplification as comprising resistance potentiometers $R_1$ and $R_2$ having movable junction points or taps $J_1$ and $J_2$, the transmitters being connected across the source S in parallel arrangement to each other to constitute the separate branches of an electrical bridge, and an indicator I provided with windings $W_1$ and $W_2$ and a pointer N responsive according to the value of relative potentials impressed on the two windings, a typical form of such indicator being a ratiometer.

It will be understood that the taps of the transmitters are to be shifted by any suitable means according to respective quantities or conditions $Q_1$ and $Q_2$ whose differential is to be measured. Accordingly, each transmitter will divide the potential of the source S according to the respective quantities or conditions. For example, if the voltages between the taps and lower terminals of the transmitters $T_1$ and $T_2$ are represented as $V_1$ and $V_2$ respectively, then $V_1$ and $V_2$ are proportional to $Q_1$ and $Q_2$ for any given potential of the source S. One winding $W_1$ is connected between the taps to constitute a diagonal arm of the bridge across which a potential is impressed having a value according to the difference of voltage division of the two transmitters—i.e., according to the differential $K_1S(V_1-V_2)$ where $K_1$ is a constant. The other winding $W_2$—which among other things is a compensating winding for nullifying effects in the instrument caused by changes of voltage of the potential source S—is connected directly across that source. The indicator I will therefore respond according to the ratio $$\frac{K_1S(V_1-V_2)}{S}$$

Since this ratio is independent of the voltage of the potential source S, the reading is a true indication of the differential $(V_1-V_2)$.

In the particularized showing of my invention in Figure 2, pressure-responsive inductive-type transmitters $10a$ and $10b$ are employed, which for simplification of description are illustrated as being identical. As before mentioned, transmitters are preferably used of the type described in the pending Kelly application Serial No. 290,869, to which reference may be had as to details. For the present purposes, each transmitter may be sufficiently described as comprising a pair of coils 11 and 12 having an associated movable armature 13 comprising magnetic material and so arranged that as the armature is moved in one direction the inductance of one coil is increased and that of the other coil is proportionately decreased. The coils of each transmitter are connected serially across an A.C. potential source 14 for the measuring system. Only by way of example, this source may be of the order of 26 v. and 400 c.p.s. Each transmitter has a fixed tap 15 between the coils. Between this tap and either end terminal of each transmitter there is developed a voltage which is a division of that of the A.C. source 14 in accordance with the positioning of the respective armatures 13. The armatures are connected to respective pressure-responsive members or diaphragms 16 constituting movable walls of respective enclosures 17. These enclosures have outwardly leading conduits 18 for connection to respective sources of pressure or vacuum, as the case may be, here referred to as $P_1$ and $P_2$.

The receiving instrument in this second embodiment is a null-type dynamometer indicator 19 preferably of the form described in the aforementioned Kelly Patent 2,572,626. This indicator has a field winding 20 connected across the potential source 14, and has a movable armature coil 21 connected in a diagonal arm or circuit 22 of the bridge leading from one tap 15 of one transmitter to a tap 15 of the other transmitter. The armature coil is arranged in the air gap of the iron core of the field coil so that it will have a varying inductive coupling with the field coil as the armature coil is moved, this varying coupling being diagrammatically represented at 23. A pointer 24 is attached to the armature coil and swings over a scale 25.

By reason of the varying inductive coupling between the armature and field coils, a variable voltage component is induced in the armature coil according to the positioning of that coil in its range of movement. This voltage component sets up a current component in the armature coil and circuit 22 which reacts with the field flux to produce a first torque component acting on the armature coil. Whenever any voltage unbalance exists between the taps 15, a voltage component is impressed on the armature coil to set up a second current component in the armature circuit. This second current component reacts with the field flux to produce a second torque component acting on the armature coil. For any given sign of voltage impressed on the armature coil via the circuit 22, the armature coil can be connected in such polarity with respect to the feed coil that these torque components oppose each other. A reading position of the instrument is one wherein these opposing torques are in balance, wherefore the instrument is termed as being of the null type. Since both of the opposing torque components are dependent equally on the potential of the source 14, each reading is independent of the voltage of the source insofar as the potential of the source is great enough to produce satisfactory operating torques in the instrument. Furthermore, although the impressed voltage component on the armature coil is nullified by the voltage component induced in the armature coil, both components are dependent equally on the voltage source with the result that the reading is proportional to the relative voltages impressed on the field and armature coils. A dynamometer type of indicator is very satisfactory for use in alternating-current systems for reading electrical quantities independently of the voltage of the potential source for the systems.

Since each reading position of the indicator 19 is one requiring a voltage impressed on the armature coil through the circuit 22 to counteract the voltage induced therein, it follows that insofar as I have herein described my second embodiment the pointer would go off-scale were the potentials of the taps 15 in balance. This means that the measuring system would be able to indicate differentials of definite value and of one sign only. However, within that range of indication the readings would be linear assuming of course that the transmitters have linear response.

In accordance with a feature of my invention, a voltage component $e_c$ is provided in the diagonal circuit 22 of the bridge to provide for "zero" indications on the scale. This voltage component is dependent on the supply source but is independent of the quantities or conditions under measurement, and may be obtained in any of various ways. Preferably, a variable voltage component $e_c$ is provided by an adjustable means so as to permit not only the indication of differential values extending from zero but also plus and minus differential values extending through zero. Furthermore, as a generalization, by adjustment of the voltage component $e_c$ a preset scale indication can be achieved for any given differential between the quantities or conditions under measurement, since a scale indication requires merely that the voltage component $e_c$, the diagonal voltage component of the bridge dependent on the differential between the conditions under measurement, and the induced voltage component in the armature coil at that scale indication shall have a net value of zero.

This voltage component $e_c$ may be introduced, for example, by means of a transformer 26 having its secondary winding serially included in the diagonal circuit 22 and its primary winding connected to the source 14. However, in order that the voltage component $e_c$ may be adjustable, the primary winding is connected to a variable autotransformer 27 which is itself connected across the source 14.

From the foregoing description it will be apparent that by adjusting the tap of the autotransformer the component $e_c$ can be set to counteract the induced voltage in the armature coil 21 at any point on the scale, it being assumed the potentials of the two taps 15 are then equal. If the component $e_c$ is a minimum for setting zero at one extremity of the scale, then the system will only indicate differentials giving rise to potential values between the taps 15 that add to the component $e_c$. On the other hand, if $e_c$ is set at a maximum value for setting zero at the other extremity of the scale, the system will only indicate differentials of opposite sign giving rise to potential unbalances between the taps 15 that subtract from $e_c$. Still further, if $e_c$ is set to place zero at an intermediate point on the scale the system will indicate differentials of one sign from one extremity of the scale to the zero point and of the opposite sign from the zero point to the other extremity of the scale. The present measuring system has therefore the inherent advantages of stability and accuracy of the dynamometer instrument, and of having moreover very simple circuitry with facility for measuring differential quantities of either one or both signs on the same scale. Moreover, by the adjustability of the means for providing the voltage for shifting the scale range, in equalities and tolerance variations in components of the system, such as in the transmitters, can be compensated.

It will be apparent that the voltage component $e_c$ in the circuit 22 for obtaining a zero differential reading on the scale may be obtained in various other ways than through a transformer as above described. For example, (1) the coils of one transmitter may be unbalanced with respect to the other, (2) the two coils of one or both of the transmitters may be wound as one coil and provided with a variable intermediate tap, (3) the coupling between the armature of one transmitter and the respective diaphragm may be adjustable to shift the armature with respect to the coils, or (4) as illustrated in Figure 3, a potentiometer 28 having a variable tap 29 may be connected electrically between the two coils of either one or both transmitters and the circuit 22 may then lead from the tap of that potentiometer. Such potentiometer may be of the simple resistance type, as illustrated, since in practice the resistance of the potentiometer may be quite small, as for example, of the order of only $\frac{1}{100}$ of the impedance of the two coils of the transmitter.

It will be understood that the embodiments of my invention herein described are intended to be illustrative and not necessarily limitative of my invention since the same are subject to changes and modifications without departure from the scope of my invention, which I endeavor to express according to the following claims.

I claim:

1. A system adapted for measuring the difference between two conditions comprising two potential-dividing devices having variable intermediate points of potential and including means for varying said points of potential respectively according to conditions whose differential is to be measured, means connecting said potential-dividing devices in a parallel arrangement forming an electrical bridge, means for connecting said parallel arrangement across a potential source, a receiving instrument comprising two coils and a movable element responsive to the relative potentials impressed on the said coils, means connecting one of said coils across said potential source, and means connecting the other of said coils between said intermediate points of said potential-dividing means for impression on said other coil of a voltage according to said differential.

2. A system adapted for measuring the difference between two conditions comprising first and second variable potential-dividing means, a first condition-responsive means in one location subjected to one variable condition, means connecting said first condition-responsive means to said first potential-dividing means for varying the same in accordance with variations in said one condition, a second condition-responsive means in a second location subjected to a second variable condition, means connecting said second condition-responsive means to said second potential-dividing means for varying the same in accordance with variations in said second condition, an electrical bridge comprising two branches connected in parallel and adapted for connection across a common source of potential, said branches comprising respectively said first and second potential-dividing means and the intermediate points of potential of said potential-dividing means forming terminals for a diagonal circuit of the bridge, an indicating instrument including two coils and deflection means responsive according to relative potentials impressed on said coils, and circuit means operatively connecting one of said coils across said potential source for energization in proportion to the voltage thereof and operatively connecting the other of said coils between said terminals in a diagonal arm of said bridge for energization according to the difference of potential between said intermediate points of said potential-dividing means.

3. A system adapted for measuring the difference between two variable conditions comprising first and second potential-varying means, first and second condition-responsive means respectively subjected to said two conditions under measurement, separate means operated by said first and second condition-responsive means for varying said potential means respectively, an electrical bridge comprising two branches connected in parallel and adapted for connection across a common source of potential, said branches respectively including said first and second potential-varying means, an arm connected between said first and second potential-varying means in diagonal relation to said bridge for impression of a variable voltage thereacross according to the difference between said conditions under measurement, a receiving instrument including current-energizable coils and indicating means responsive according to the voltage impressed on said coils, means for energizing one of said coils according to the potential of said source, the other of said coils being serially connected in said diagonal arm of said bridge.

4. In an electrical system including a source of A.C. potential: the combination of first and second potential-varying means variable according to conditions or quantities under measurement, an alternating-current electrical bridge comprising two branches connected in parallel and adapted for connection across said A.C. potential source, said branches respectively serially including said potential-varying means, a diagonal arm of said bridge connected between intermediate points of said branches for impression of a voltage thereacross according to the difference between said conditions under measurement, a dynamometer-type instrument including a first coil operatively connected across said source and a movable armature coil in the field of said first coil having varying inductive coupling therewith as said armature coil is moved, said armature coil being connected serially in said diagonal arm of said bridge and the voltage impressed on said diagonal arm being in at least partial phase opposition to the voltage induced in the armature coil.

5. In an electrical system including a source of A.C. potential: the combination of first and second potential-varying means variable respectively according to conditions or quantities under measurement, an alternating-current electrical bridge connected across said potential source and including said potential-varying means respectively in the separate parallel branches of the bridge, a diagonal arm of said bridge connected between intermediate points of said branches for providing a first voltage component of variable character according to the difference between said conditions under measurement, means associated with said bridge causing it to be electrically unbalanced when there is a zero differential between said conditions, said unbalance causing a second voltage component to appear in said diagonal arm dependent only on said voltage source, said first and second voltage components being of such magnitude as to have a net real value at all times throughout the operating range of said potential-varying means, a dynamometer-type receiving instrument including a first coil connected to said source and a movable armature coil in the field of said first coil having varying inductive coupling therewith as the armature coil is moved, and means connecting said armature coil in said diagonal arm in phase relationship to cause the diagonal voltage of said bridge impressed on said armature coil to oppose the voltage induced in said armature coil, said induced voltage in said armature coil being adapted within the range of said armature coil to balance said net real value of said first and second voltage components.

6. In a system adapted for measuring the difference between two conditions including an A.C. source of potential; the combination of first and second variable potential-dividing means, a first condition-responsive means in one location subjected to one variable condition, means connecting said first condition-responsive means to said first potential-dividing means for varying the same in accordance with variations in said one condition, a second condition-responsive means in a second location subjected to a second variable condition, means connecting said second condition-responsive means to said second potential-dividing means for varying the same in accordance with variations in said second condition, an electrical bridge connected across said A.C. source of potential and including said first and second potential-dividing means in separate parallel branches thereof with the intermediate points of potential thereof forming terminals, a diagonal circuit of the bridge connected between said terminals, a null-type dynamometer instrument including a first coil connected across said source and a movable armature coil in the field of said first coil having varying inductive coupling therewith as said armature coil is moved, means connecting said movable armature coil in said diagonal circuit for impression on said armature coil of a voltage component dependent on the differential between said conditions under measurement, said armature coil having a stable indicating position at each point whereat the net current in the armature coil is zero, and adjustable means for variably unbalancing said bridge in such direction as to predeterminately set the indicating position of said armature coil for any given relation of said conditions under measurement.

7. In an electrical measuring system including a source of A.C. potential: the combination of an electrical bridge connected across said potential source; means for varying the state of unbalance of said bridge; a dynamometer type measuring instrument having an armature coil connected in the diagonal arm of said electrical bridge and having a field coil connected to said potential source; and means for introducing a voltage component in said diagonal arm dependent on said potential source and independent of the state of unbalance of said bridge.

References Cited in the file of this patent

UNITED STATES PATENTS

| | | |
|---|---|---|
| 1,695,424 | Harrison | Dec. 18, 1928 |
| 2,293,403 | Razek | Aug. 18, 1942 |
| 2,363,690 | Razek | Nov. 28, 1944 |
| 2,518,797 | Landon | Aug. 15, 1950 |
| 2,522,976 | Williams | Sept. 19, 1950 |